United States Patent
McKeeth (10) Patent No.: US 7,652,669 B2
(45) Date of Patent: *Jan. 26, 2010

(54) ANIMATION PACKAGER FOR AN ON-LINE BOOK

(75) Inventor: James A. McKeeth, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 303 days.

This patent is subject to a terminal disclaimer.

(21) Appl. No.: 11/233,714

(22) Filed: Sep. 23, 2005

(65) Prior Publication Data

US 2006/0017736 A1     Jan. 26, 2006

Related U.S. Application Data (63) Continuation of application No. 10/701,117, filed on Nov. 4, 2003, now Pat. No. 7,053,899, which is a continuation of application No. 10/287,276, filed on Nov. 1, 2002, now Pat. No. 6,661,419, which is a continuation of application No. 09/630,110, filed on Aug. 1, 2000, now Pat. No. 6,483,512, which is a continuation of application No. 09/119,165, filed on Jul. 20, 1998, now Pat. No. 6,157,392.

(51) Int. Cl.
*G06T 15/70*     (2006.01)

(52) U.S. Cl. .................. 345/473; 345/474; 345/956

(58) Field of Classification Search ........... 345/473, 345/474, 956
See application file for complete search history.

(56) References Cited

U.S. PATENT DOCUMENTS

| | | | | |
|---|---|---|---|---|
| 5,021,989 A | * | 6/1991 | Fujisawa et al. | 345/661 |
| 5,171,038 A | * | 12/1992 | Bowler | 281/15.1 |
| 5,319,705 A | | 6/1994 | Halter et al. | |
| 5,353,074 A | * | 10/1994 | Jones et al. | 353/122 |
| 5,367,621 A | | 11/1994 | Cohen et al. | |
| 5,634,129 A | * | 5/1997 | Dickinson | 719/315 |
| 5,678,822 A | * | 10/1997 | Setteducati | 273/296 |
| 5,706,505 A | | 1/1998 | Fraley et al. | |
| 5,870,683 A | * | 2/1999 | Wells et al. | 455/566 |
| 5,930,379 A | | 7/1999 | Rehg et al. | |
| 5,986,622 A | | 11/1999 | Ong | |

(Continued)

OTHER PUBLICATIONS

Making metadata: a study of metadata creation for a mixed physical-digital collection Catherine C. Marshall May 1998 Proceedings of the third ACM conference on Digital libraries DL '98 Publisher: ACM Press.*

(Continued)

*Primary Examiner*—Javid A Amini
(74) *Attorney, Agent, or Firm*—Knobbe, Martens, Olson & Bear, LLP (57) ABSTRACT

A system for creating an on-line book with an animated cover. The system includes an animation program for inserting an animation sequence at the beginning of an on-line book which is compiled into the M14 format. The animation program includes: a user interface module configured to receive input from a user; a data sequencing module which arranges at least two graphical images in a sequence; and an update module which modifies at least one compilation control file. The animation program modifies the control files for an on-line book compiler to provide for the display of an animated object upon the opening of the on-line book.

20 Claims, 6 Drawing Sheets

U.S. PATENT DOCUMENTS

| | | | | |
|---|---|---|---|---|
| 6,012,068 | A * | 1/2000 | Boezeman et al. | 707/104.1 |
| 6,014,150 | A | 1/2000 | Boucher | |
| 6,031,549 | A | 2/2000 | Hayes-Roth | |
| 6,057,859 | A | 5/2000 | Handelman et al. | |
| 6,064,771 | A * | 5/2000 | Migdal et al. | 382/232 |
| 6,157,392 | A * | 12/2000 | McKeeth | 345/473 |
| 6,219,069 | B1 * | 4/2001 | McKeeth | 345/473 |
| 6,407,757 | B1 * | 6/2002 | Ho | 715/776 |
| 6,446,111 | B1 | 9/2002 | Lowery | |
| 6,483,512 | B1 * | 11/2002 | McKeeth | 345/473 |
| 6,661,419 | B2 * | 12/2003 | McKeeth | 345/473 |
| 7,053,899 | B2 * | 5/2006 | McKeeth | 345/473 |
| 2003/0052884 | A1 * | 3/2003 | McKeeth | 345/473 |
| 2004/0130551 | A1 * | 7/2004 | McKeeth | 345/473 |
| 2006/0017736 | A1 * | 1/2006 | McKeeth | 345/473 |

OTHER PUBLICATIONS

Metadata visualization for digital libraries: interactive timeline editing and review Vijay Kumar, Richard Furuta, Robert B. Allen May 1998 Proceedings of the third ACM conference on Digital libraries DL '98 Publisher: ACM Press.*

VIBDaST: a virtual interactive book as a data structures teaching aid Dimitrios Theotokis, George Gyftodimos, Panagiotis Georgiadis, George Philokyprou Jun. 1997 ACM SIGCSE Bulletin, Proceedings of the 2nd conference on Integrating technology into computer science education ITiCSE '97, vol. 29 Issue 3 Publisher: ACM Press.*

Graphics Interchange Format (sm) Version 89a, in 35 pages © 1987, 1988, 1990, ComuServe Incorporated, Columbus Ohio, Document Date Jul. 30, 1990.

Rose et al., Efficient Generation of Motion Transitions using Spacetime Constraints, ACM Apr. 1996, pp. 147-154.

Gleicher, Motion Path Editing, ACM Jun. 2001, Proceedings of the 2001 Symposium on interactive 3D graphics, pp. 195-202.

* cited by examiner

ANIMATION PACKAGER FOR AN ON-LINE BOOK

RELATED APPLICATIONS

This application is a continuation of U.S. patent application Ser. No. 10/701,117, filed Nov. 4, 2003 now U.S. Pat. No. 7,053,899, which is a continuation of U.S. patent application Ser. No. 10/287,276, filed Nov. 1, 2002, now U.S. Pat. No. 6,661,419, which in turn is a continuation of U.S. patent application Ser. No. 09/630,110, filed Aug. 1, 2000, now U.S. Pat. No. 6,483,512, which in turn is a continuation of U.S. application Ser. No. 09/119,165, filed on Jul. 20, 1998, now U.S. Pat. No. 6,157,392. These applications are incorporated by reference in their entirety. U.S. patent application entitled "Method for Generating Animation in an On-Line Book," filed Jul. 20, 1998, application Ser. No. 09/119,331, now U.S. Pat. No. 6,219,069, contains related subject matter.

BACKGROUND OF THE INVENTION

1. Field of the Invention

The present invention relates generally to computers, and more particularly to a method for generating animation for an on-line book.

2. Description of Related Technology

Currently, there are several web publishing systems by which publishers of textual material can generate books which can be accessed on-line through a computer. One use of on-line books is to display literature on a company's products and services. Particularly in the computer industry, on-line books are often used to display and advertise goods, such as computers and computer peripherals as well as provide documentation for their use. Similar to traditional books, a reader of the on-line book can view each of the pages sequentially. However, a reader of the on-line books can also use a mouse or other input device to click on selected text to jump or hyper-link to another page in the book. The ability of on-line books to associate words or icons within a page to other words on other pages has caused many publishers to make available on-line versions of their materials.

An example of such a publishing system is the "WebBook Publisher" by Modern Age Books. This publishing system creates a plurality of data files which comprise the pages of an on-line book. Once created, the on-line book is typically transmitted by a compact disk to a user. The user then reads the electronic book with a viewing program. An example of a viewing program is the E-Doc 32 software program.

One prevalent viewing format is the Media View Version 1.4 (M14) file format. The M14 has become widely supported since a compiler for this format is part of the public domain. However, one problem with the existing publishing systems is that these systems do not allow for the automatic integration of an animated sequence upon the opening of a book. For example, the WebBook Publisher only provides a mechanism for inserting two visual images on the cover of the on-line book. The publisher of an on-line book typically uses the first image to display a title of the book and the second image to display the copyright notice. The WebBook Publisher does not provide for the ability to include an animated sequence upon the opening of an on-line book. The ability to include an animated sequence at the beginning of the on-line book would allow publishers to distinguish their books from the competition. Currently, manufacturers are unable to take full advantage of the functionality provided by a reader's computer, which would permit the production of an animated cover.

Therefore, on-line book publishers are in need of an application which provides for the generation of a animated object upon the opening of a book. This application should also allow for the automatic updating of any scripting and compiler files that are needed for the compilation of the on-line book.

SUMMARY OF THE INVENTION

One embodiment of the invention is an animation system for updating a plurality of compiler files, comprising at least two graphical images, a data sequencing module which arranges said at least two graphical images in an animated sequence, at least one compilation control file, and an update module which modifies said at least one compilation control file to include a reference to said at least two graphical images.

Another embodiment of the invention includes a system for inserting an animated display into an on-line book, comprising means for ordering a list of images which are displayed upon the opening of an on-line book, means for inserting the ordered list in a scripting file, means for inserting a reference to each of the images in a project file, means for inputting the project file into a compiler, and means for compiling the scripting file and the images into an on-line book.

DETAILED DESCRIPTION OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

System Overview

Figure 1:
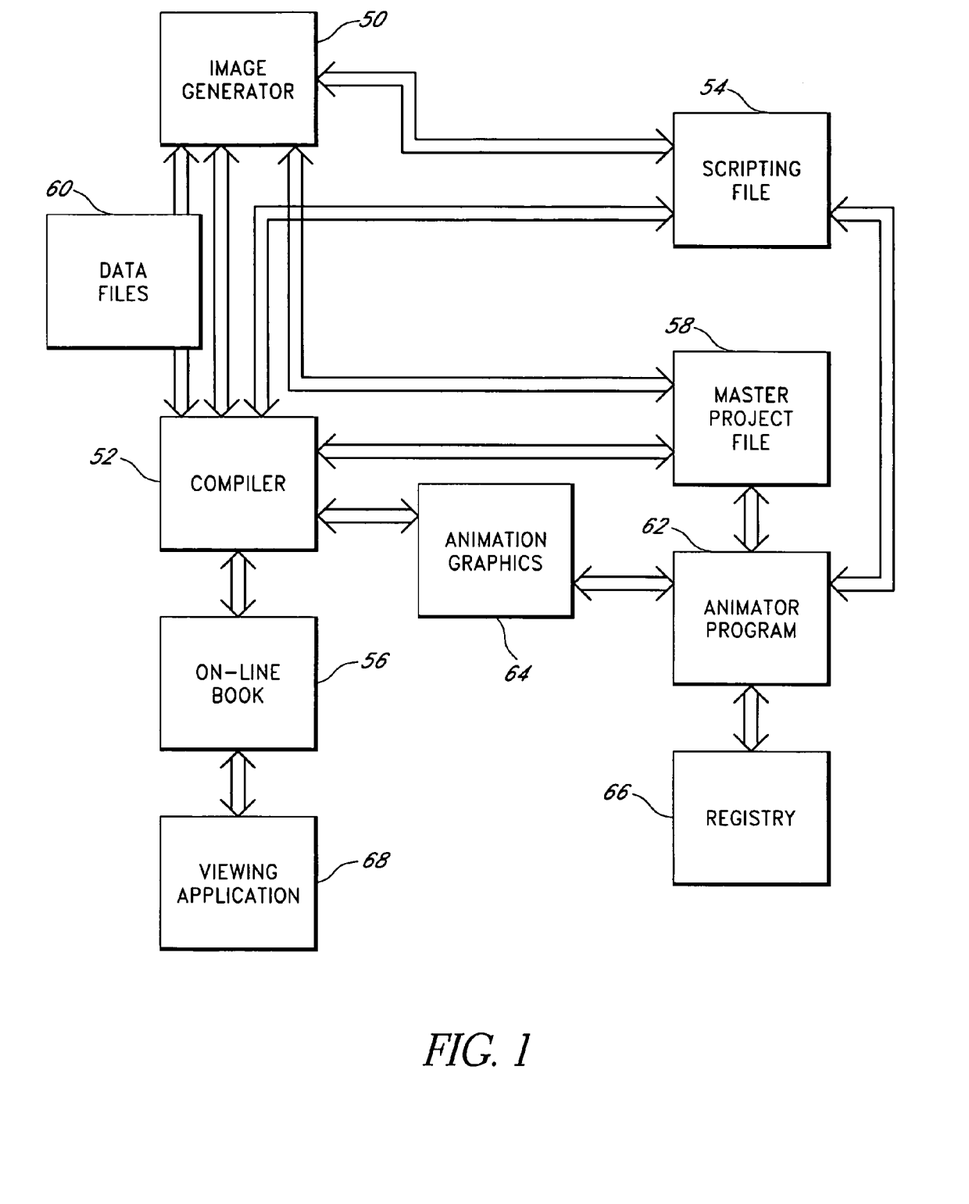
FIG. 1 is a block diagram illustrating one embodiment of an animation system including an animator program.

Referring to FIG. 1, the functional components of an on-line book publishing system are illustrated. An image generator 50 is in communication with a compiler 52. The image generator 50 is used to organize and create a plurality of individual pages which are used in an on-line book 56. The image generator 50 may be any software publishing system that generates graphical data. An example of the image generator 50 is the WebBook Publisher by Modern Age books. The compiler 52 may be any M14 on-line book compiler. An example of such compiler 52 is the Media View Compiler which is freely available to the public on the internet. The Media View Compiler can be downloaded from the internet location Custom Controls for Mediaview (visited Jan. 14, 1998) <http://www.innercity.com/mvreadme.htm>.

The compiler 52 may be invoked directly by the image generator 50 once a set of data files 60 are provided by the image generator 50. The image generator 50 and the compiler 52 are in communication with a scripting file 54 and a master project file 58. The master project file 58, which typically has a filename extension of ".mvp," is a text file that contains the name of each of the data files 60 to be included in the on-line book 56. Typically, the image generator 50 provides a master project file 58 for each on-line book 56. The master project file 58 contains a listing of compiler options, definitions, and a baggage section. The baggage section identifies for the compiler 52 the names of the files other than the text and program code that are to be included in the on-line book 56.

The scripting file 54 includes a set of commands which are executed whenever a user first opens the on-line book 56. Upon the creation of the on-line book 56, the compiler 52 incorporates the scripting file 54 into the on-line book 56. Typically, in the M14 file format the name of the scripting file 54 is "autoexec.scr."

An animator program 62 is in communication with the scripting file 54, the master project file 58, and a group of animation files 64. The animation files 64 comprise a plurality of bitmaps and graphical images which are designed to be displayed upon the opening of the on-line book 56. In addition to having the graphical images of the animated sequence, the animation files 64 has a control file 65.

The control file 65 contains the filenames of each of the graphical images which are a part of the animation process. In addition, the control file 65 contains a timing field for each file name, wherein the timing field indicates the length of time that each of the individual graphical images of the animation should be displayed before being replaced on the screen by the next graphical image. The control file 65 also has an indicator to arrange each of the graphical images in the order that the graphical images will be displayed. The data in the control file 65 may be alternatively stored in other formats. For example, the sequencing and timing data may be stored in system memory or the timing data and file names could be stored in a database. One of the purposes of the animator program 62 is to update the master project file 58 and the scripting file 54 to include references to each of the images in the animation graphics 64. The animation program 62 also maintains a registry 66 which keeps historical information of user preferences such as the size of a user interface window. It is noted that in one embodiment of the invention, the animator program 62 is integrated into the image generator 50.

Referring to FIG. 1, a viewing application 68 is used by a receiver of the on-line book 56 to view the pages of the on-line book 56. Versions of the viewing software are commercially available to the public on the internet. The E-DOC32 can be downloaded from the internet location Welcome to Modern Age Books (visited Jun. 19, 1998) <http://www.mabooks.com>.

Figure 2:
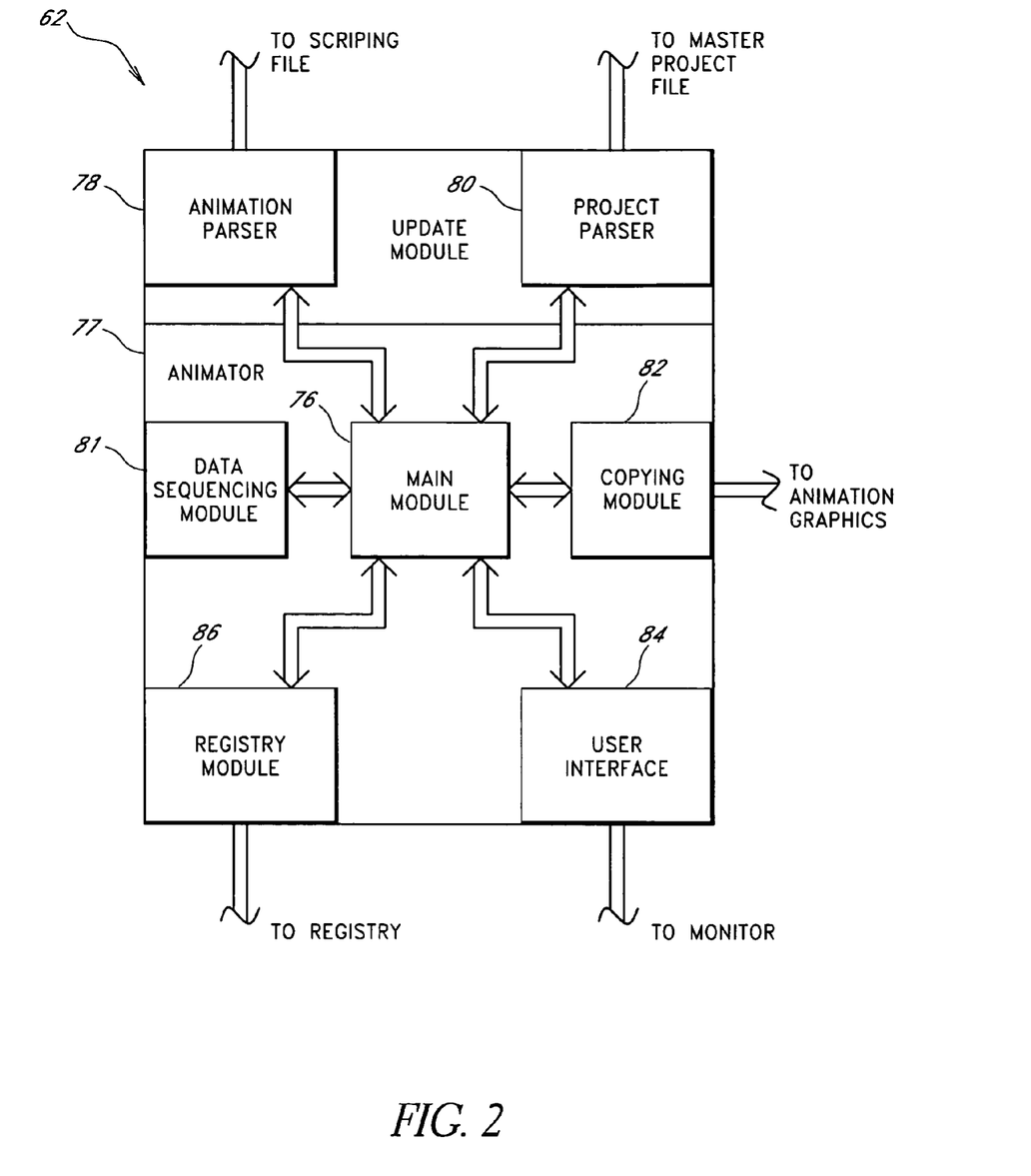
FIG. 2 is a block diagram illustrating the components of the animator program shown in FIG. 1.

Now referring to FIG. 2, some of the components of the animator program 62 are illustrated. The animator program 62 is comprised of various modules 76-86. As can be appreciated by one of ordinary skill in the art, each of the modules 76-86 comprises various sub-routines, procedures, definitional statements, and macros. Each of the modules 76-86 is typically compiled into a single executable program. Therefore, the following description of each of the modules 76-86 is used for convenience to describe the functionality of the animator program 62. Thus, the processes that are undergone by each of the modules 76-86 may be arbitrarily redistributed to one of the other modules. The animator program 62 has a main module 76 which controls the other components of the animator program 62. The main module 76 controls an update module 77, a data sequencing module 81, a copying module 82, a user interface module 84, and a registry module 86. Each of these modules 76 through 86 are described further below.

The update module 77 includes an animation parser 78 and a project parser 80. The animation parser 78 and the project parser 80 each control and update the scripting file 54 and the master project file 58, respectively. The data sequencing module 81 maintains an internal list of the ordering of the animation files 64 (FIG. 1). The copying module 82 copies all of the animation files 64 into a directory which is known and accessible by the compiler 52. The user interface module 84 provides a graphical interface to allow a user of the animator program 62 to select the animation sequence for the appropriate on-line book 56. The registry module 86 controls and updates the registry 66 so as to record any user preferences that are observed.

The animation program 62 may be written in any programming language such as C, C++, BASIC, Pascal, and FORTRAN, and can run under any well-known operating system. C, C++, BASIC, Pascal, and FORTRAN are industry standard programming languages for which many commercial compilers can be used to create executable code.

Figure 3:
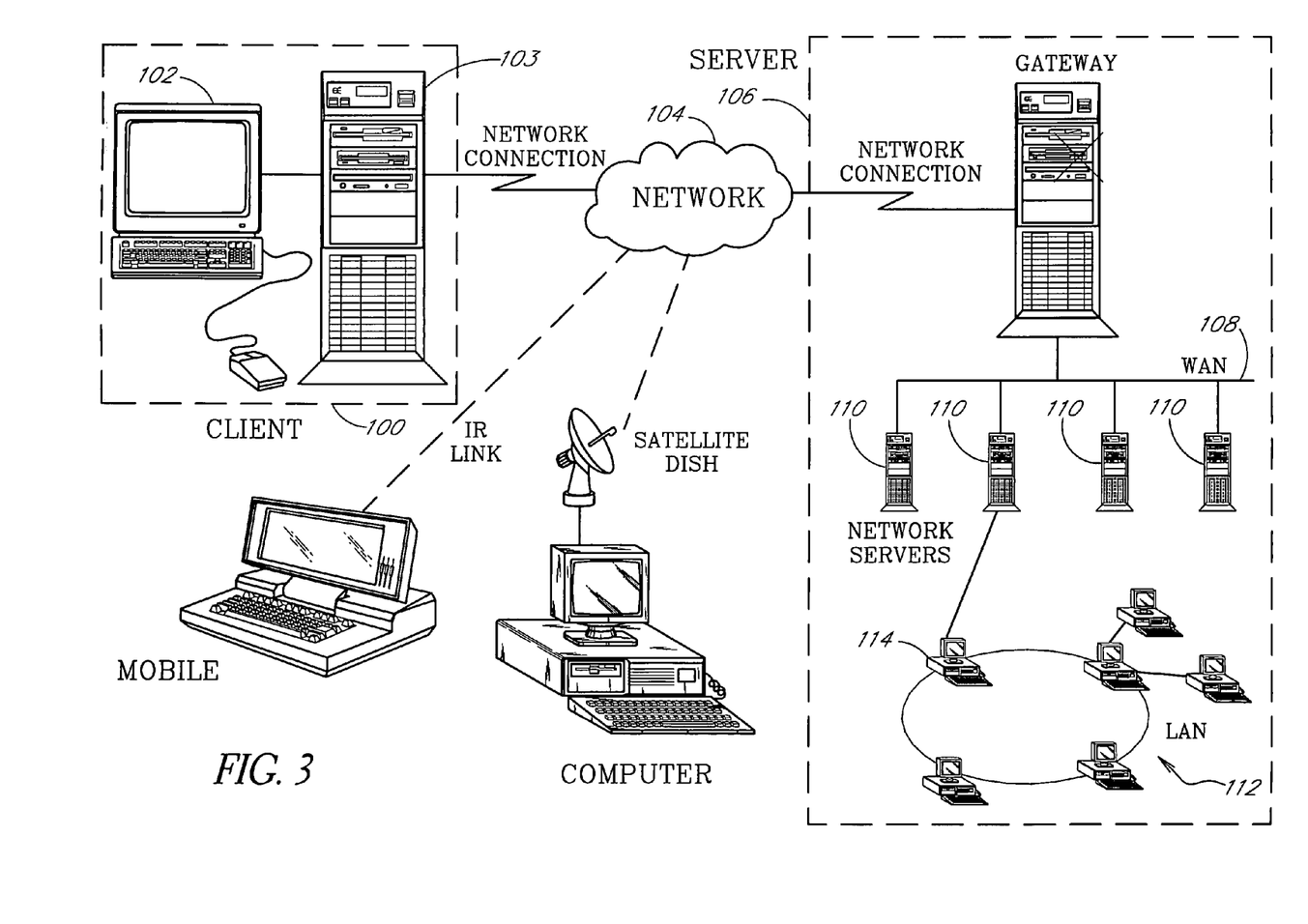
FIG. 3 is a diagram showing the various computer architectures that may contain the animator program shown in FIG. 1.

FIG. 3 is a diagram illustrating a computer environment associated with the invention. A client computer 100 has a monitor 102 and a processing unit 103. The processing unit 103 includes a memory for storing data therein. The client computer 100 includes the image generator 50 and the on-line book compiler 52 (FIG. 1). The client computer 100 is connected to a server computer 106 through a network 104. The network 104 may include any type of group of computers that can communicate through a communication pathway including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Note that computing devices may be desktop, server, portable, hand-held, set-top, or any other desired type of configuration.

The server 106 contains the animator program 62. In one implementation, the server 106 includes a gateway which is connected to a WAN 108. The WAN 108 has a plurality of network servers 110. One of the network servers 110 is connected to a LAN 112 comprising a plurality of computers 114. The animator program 62 may be located on one the network servers 110 or another computer in the network 104. In one embodiment of the invention, the animator program 62 executes in part on a plurality of the network servers 110. In another embodiment of the invention, the animator program 62 executes on a plurality of the computers 114 on the LAN 112. In yet another embodiment of the invention, the animator program 62 resides on the client computer 100. It is important to understand that the animator program 62 may be hosted on any computing device so long as a communication pathway exists between the animator program 62, the animated graphics 64, the scripting file 54, and the master project file 58.

Method of Operation

Figure 4:
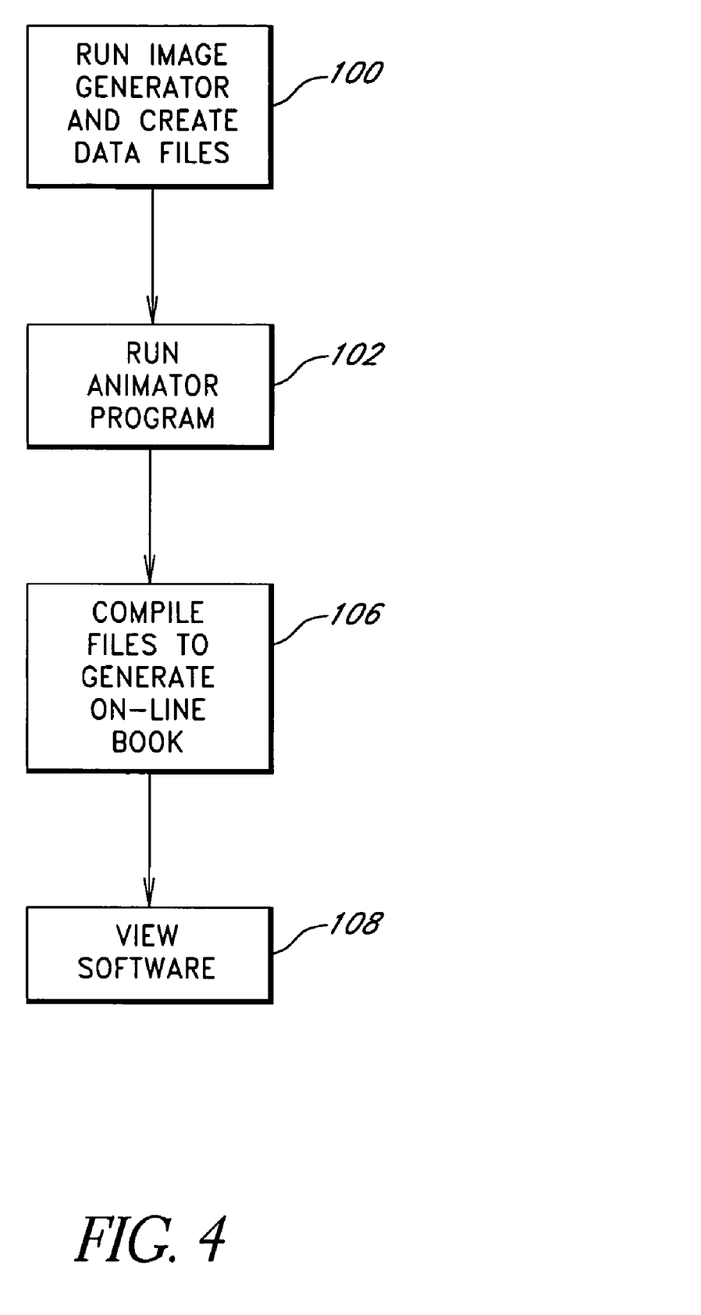
FIG. 4 is a flow diagram showing the animation process of the computer system shown in FIG. 1.

Referring to FIG. 4, the process for creating an on-line book 56 with an animated cover is illustrated. Starting at a state 100, a user executes or runs the image generator 50 which the user uses to create a plurality of data files 60. The data files 60 comprise the pages of the on-line book 56. The method of creating the data files 60 using the generator is well known in the art. For further details, one may reference a user manual that traditionally comes with the image generator 50.

Figure 5A:
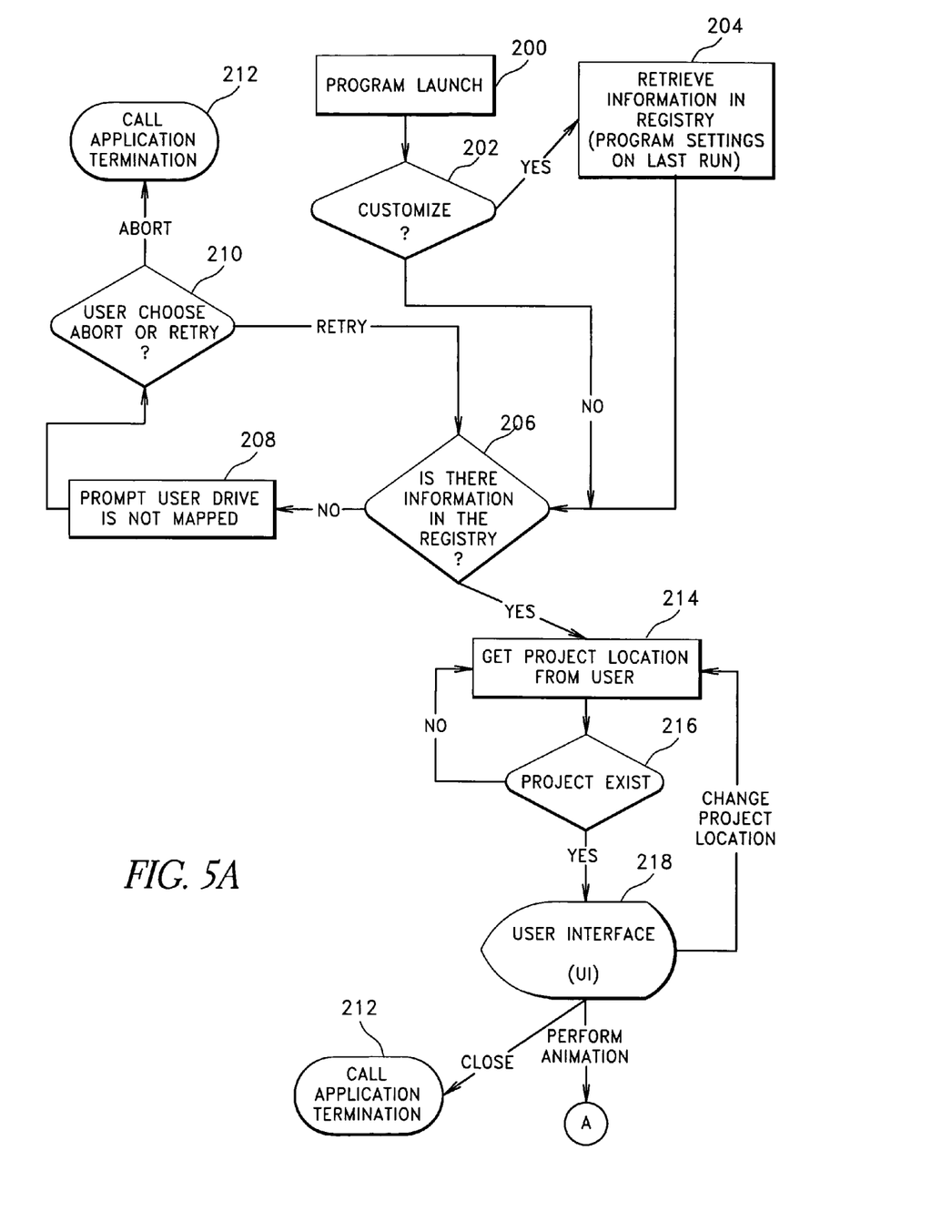
FIGS. 5*a* and 5*b* are flow diagrams illustrating the animation process of the animator program shown in FIG. 1.
Figure 5B:
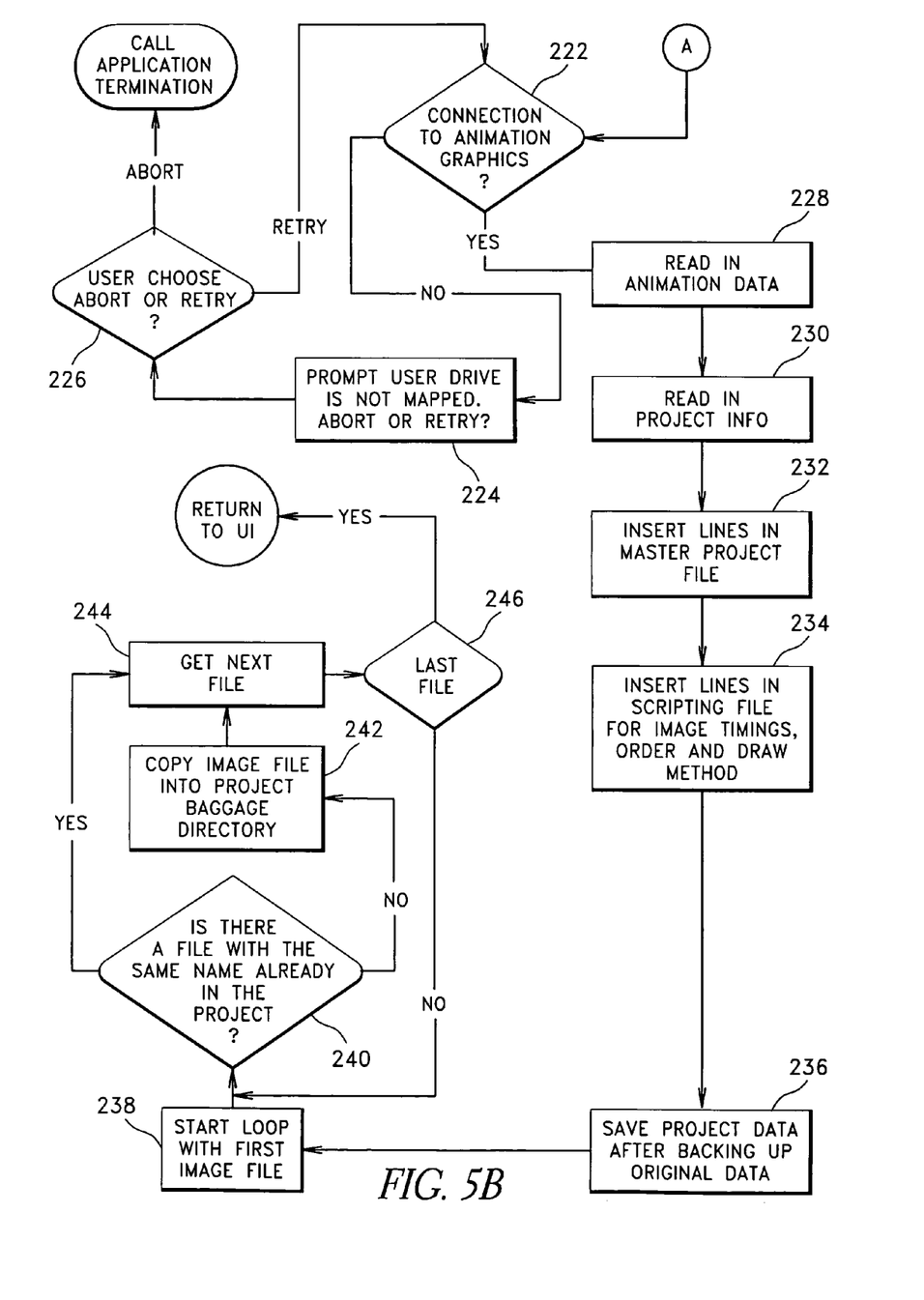

Next, at a state 102, the user runs the animator program 62. The method of operation of the animator program 62 is described in further detail with reference to FIGS. 5 and 6. However, in summation, the animator program 62 modifies the scripting file 54 generated by the image generator 62, modifies the master project file 58 to include a reference to the animation graphics 64, and copies the animation graphics 64 into a directory which is used by the compiler 52 to generate the on-line book 56.

Moving to a state 106, the compiler 52 compiles the data files 60 created by the image generator into an on-line book 56. The process for compiling the data files using the scripting file 54 and the master project file 58 is known in the art. For further reference, one may review the on-line references provided by the MediaView Compiler v1.4. Continuing to a state 108, the user views the on-line book 56 through the use of the viewing application 68.

Referring now to FIGS. 5a and 5b, the method of operation of the animator program 62 is further described. Starting at a state 200, a user starts executing the animator program 62. Moving to a decision state 202, the animation program 62 may optionally customize the animator program 62 based upon personalized settings in the registry 66. If the animator program 62 determines that there is information in the registry 66, the animator program 62 configures the personalized settings at a state 204. The personalized settings may define a size and location of the user interface window or a default project location of a master project file 58. From the state 204, or from state 202 if the animator program 62 determines there is no information in the registry 66, the method moves to a decision state 206.

At decision state 206, the animator program 62 determines whether it has access to the master project file 58, which may be located in the default project location. If the animator 62 finds the master project file 58 in the default project location, the animator program 62 proceeds to a state 214. Otherwise, if the animator program 62 has a problem accessing the files in the default project location, the animator program 62 prompts the user at state 208, asking whether the user wants to abort or retry to establish a connection with the default project location. Next, at a decision state 210, if the user requests an abort, the animator program 62 calls a routine for application termination at a state 212. At state 212, during application termination the animator program 62 frees any memory that has been allocated. Otherwise, referring again to decision state 210, if the user requests to retry the connection, the animator program 62 returns to the decision state 206 to re-test the connection with the default project location.

Referring again to the state 214, the animator program 62 lets the user optionally change the project location from the default project to a new project location. Moving to a decision state 216, the animator program 62 checks for the presence of the master project file 58 in the directory that was specified by the user. If the animator program 62 is not able to find a master project file 58, the animator program 62 returns to state 214 to re-request another project location from the user. Once a valid project file is found, at a state 218 the animator program 62 displays a menu to the user through the user interface 84. The menu describes various options to the user who is creating the animation. The menu provides a checkbox for the user to select one of the following options: to select another project location (state 214), to terminate the application (state 212), or to proceed with the animation process with the currently selected project location (decision state 222). Optionally, the menu may display an animated set of pictures during the animation process. The animated set of pictures is an identifier for the animating application.

If the user selects to proceed with the animation process, the method moves to the decision state 222, wherein animator program 62 determines whether there is a connection to the animation files 64. For the embodiment of the invention demonstrated with reference to FIGS. 4 and 5, the animation files 64 are created prior to the execution of the animator program 62. However, the animator program 62 can optionally include an image generator 50 which will generate the graphical images in the animation files 64 during the animation process. Further, the animator program 62 will arrange and sequence each of the generated graphical images. The animator program 62 will also allow a user to designate the display time for each of the graphical images. As is appreciated by one of ordinary skill in the art, the process for creating an image generator 50 is well known.

If, in state 222, the animator program 62 cannot access the animation files 64, the process moves to a state 224 wherein the animator program 62 asks the user whether he or she wants to abort or to retry the connection with the animation graphics 64. Sometimes the connection between the client 100 and the server 106 fails due to a network failure. However, these connection failures are sometimes transient. Next, at a decision state 226, if the user requests an abort, the animator program 62 calls a routine for application termination at the state 212. Otherwise, if the user requests to retry the connection, the animator program 62 returns to the state 222 to re-test the connection.

After the connection to the animation files 64 is established, the animator program 62 proceeds to a state 228 wherein it parses the animation files 64 into memory. Using the control file 65, the animator program 62 parses into memory the file name of each of the graphical images. Proceeding to a state 230, the animator program 62 reads into memory the project information from the master project file 58 and the scripting file 54.

Moving to a state 232, the animator program 62 inserts the filenames of the graphical images that were read from the control file 65 into the master project file 58. Appendix "A" discloses an example of the state of a master project file 58 before and after the animation information has been added to the master project file 58 by the animator program 62. Referring to Appendix "A," a baggage section is included in the master project file 58. The "Before" column of Appendix "A" contains the contents of a typical master project file 58 before the animation process is initiated. The majority of the filenames listed in the baggage section are the names of the files that are to displayed as pages in the on-line book 56. An example of page files include the "backgnd.bmp" file the "cover.bmp" file and the "cpyr.bmp" file, which each respectively contain background material, a cover page, and a copyright notice.

The "After" column of Appendix "A" displays the state of the master project file 58 after being processed by the animator program 62. As is seen in the "After" column, the animator program 62 has inserted the names of the graphical images that are used for the cover animation. Referring again to the "After" column of Appendix "A," all of the files in the master project file 58 with the prefix "Animg" are used as part of the animation process. Each of the "Animg" files are a frame in the animation display.

Proceeding to a state 234, the animator program 62 also updates the scripting file 54. In the M14 file format, the scripting file 54 is eventually incorporated into the on-line book 56 by the compiler 52. The scripting file 54 is executed when a viewer runs a viewer application 68 to open the on-line book 56. The scripting file 54 sets up the user interface for the viewing application 68.

Referring to Appendix "B," the state of the scripting file 54 before and after the animation processing is illustrated. The "After" column of Appendix "B" shows that a series of Splash( ) commands are inserted into the scripting file 54 by the animator program 62. The Splash( ) command displays a graphical image for an identified time frame. The format of the Splash( ) command is Splash(ImageFileName, Seconds, Removal. The variable ImageFileName is the filename of the image which is to be displayed. The variable Seconds defines the number of whole seconds the image is displayed before moving to the next line in the script. If a zero is used in the Seconds field, the image is displayed for a fraction of a second. The variable Removal defines the method to be used for removing the bitmap after the bitmap is displayed for the time specified in the Seconds field. A value of zero in the Removal field indicates that the displayed image should remain on the screen while the next command in the script is executed. A value of one in the Removal field indicates that the graphical image should be erased after it is displayed. If the size of the one graphical image is different than the next, the previous graphical image should be erased to allow the next graphical image to be centered on the screen and drawn correctly. Also note that the designer of the this particular animation sequence chose to display each of the graphical images twice, instead of once, to fine-tune the animation effect.

In one embodiment of the invention, the values for the variables Seconds and Removal are supplied by the inventor. In another embodiment of the invention, the values for the variables Seconds and Removal are calculated by the animator program 62 so as to maximize the animation effect.

Next, at a state 236, the animator program 62 saves a back-up version of the scripting file 54 and the master project file 58. The back-up feature enables users of the animator program 62 to revert to pre-updated versions of the file if the user of the system decides not to use the animation display. Next, at a state 238 the animator program 62 starts a computing loop to copy all of the graphical images which are a part of the animation graphics 64 to a baggage directory. After the animator program 62 finishes operation, the compiler 52 looks into the baggage directory to find all of the files that are to be incorporated into the on-line book 56. Proceeding to a decision state 240, the animator program 62 checks whether the first image identified in the control file 65 is in the project baggage directory. If first image is not in the directory, at a state 242 the animator program 62 copies the image to the project baggage directory. Proceeding to a state 244, the animator program 62 checks the next image in the control file 65. Moving to the decision state 246, if the animator program 62 determines that all of the graphical images are copied, the animation program 62 returns to state 218 to await further instructions from the user. Otherwise, if the animator program 62 determines that further images in the control file 65 need to be copied, the animator program 62 returns to the decision state 240 to finish the copying process.

The animator program 62 overcomes the problem of static title pages in an on-line book by providing a quick and efficient mechanism by which publishers of the on-line book 56 can incorporate an animated sequence onto the cover of an on-line book 56. Before the teaching of the invention, on-line book publishers had no means for automatically updating the scripting file 54 and the master project file 58. However, using the animator program 62, a publisher may now update the scripting file 54 and the master project file 58 automatically upon receiving as input the file names of each of the images for the animated sequence. The animator program 62 may also optionally be used to create and arrange the graphical images of the animated sequence in their display order.

By using the animator program 62, an on-line book publisher is able to create a professional product and make further use of the viewer's computer hardware. The animator program 62 also provides for the rapid insertion of the same graphical sequence in a plurality of on-line books. This feature is often needed when the graphical images comprise a standard trademark or logo of the on-line book publisher. However, by using the animator program 62, the process for providing the animated image for a plurality of on-line books is easily accomplished.

While the above detailed description has shown, described, and pointed out fundamental novel features of the invention as applied to various embodiments, it will be understood that various omissions and substitutions and changes in the form and details of the system illustrated may be made by those skilled in the art, without departing from the intent of the invention. The scope of the invention is indicated by the appended claims rather than by the foregoing description. All changes which come within the meaning and range of equivalency of the claims are to be embraced within their scope.

APPENDIX "A"

| Before | After |
|---|---|
| [OPTIONS] | [OPTIONS] |
| COMPRESS = HIGH | COMPRESS = HIGH |
| ROOT = C:\\Work\\Compiled, rtf, baggage, zipped, images | ROOT = C:\\Work\\Compiled, rtf, baggage, zipped, images |
| WARNING = 3 | WARNING = 3 |
| SYSTEM = PC | SYSTEM = PC |
| MAKE = FULL | MAKE = FULL |
| BATCH = FALSE | BATCH = FALSE |
| TITLE = (new project) | TITLE = (new project) |
| CONTENTS = CONTENTS | CONTENTS = CONTENTS |
| [FILES] | [FILES] |
| contents.rtf | contents.rtf |
| Revisi~1.rtf | Revisi~1.rtf |
| 1Intro~1.rtf | 1Intro~1.rtf |
| 2Insta~1.rtf | 2Insta~1.rtf |
| 3Adapt~1.rtf | 3Adapt~1.rtf |
| 4Troub~1.rtf | 4Troub~1.rtf |
| 5Quest~1.rtf | 5Quest~1.rtf |
| ASmall~1.rtf | ASmall~1.rtf |
| BBusLo~1.rtf | BBusLo~1.rtf |
| Standa~1.rtf | Standa~1.rtf |
| N01.rtf | N01.rtf |
| N02.rtf | N02.rtf |
| N03.rtf | N03.rtf |
| N04.rtf | N04.rtf |
| [BAGGAGE] | [BAGGAGE] |
| init | Animg23.bmp |
| autoexec.scr | Animg10.bmp |
| backgnd.bmp | Animg11.bmp |
| cover.bmp | Animg12.bmp |
| cpyrt.bmp | Animg13.bmp |
| paltable | Animg14.bmp |
| credits.bmp | Animg15.bmp |
| 1-1.bmp | Animg16.bmp |
| bullet.bmp | Animg17.bmp |
| note.bmp | Animg18.bmp |
| 2-1.bmp | Animg19.bmp |
| 2-2.bmp | Animg2.bmp |
| 2-3.bmp | Animg20.bmp |
| 2-4.bmp | Animg21.bmp |
| 2-5.bmp | Animg22.bmp |
| 2-6.bmp | Animg1.bmp |

-continued

| Before | After |
|---|---|
| 2-7.bmp | Animg24.bmp |
| 2-8.bmp | Animg25.bmp |
| 3-1.bmp | Animg26.bmp |
| 3-2.bmp | Animg27.bmp |
| 3-3.bmp | Animg28.bmp |
| 3-4.bmp | Animg29.bmp |
| 3-5.bmp | Animg3.bmp |
| 3-6.bmp | Animg30.bmp |
| 3-7.bmp | Animg31.bmp |
| 3-8.bmp | Animg32.bmp |
| 3-9.bmp | Animg33.bmp |
| 3-10.bmp | Animg34.bmp |
| 3-11.bmp | Animg35.bmp |
| 3-12.bmp | Animg4.bmp |
| 3-13.bmp | Animg5.bmp |
| 3-14.bmp | Animg6.bmp |
| 3-15.bmp | Animg7.bmp |
| 3-16.bmp | Animg8.bmp |
| 3-17.bmp | Animg9.bmp |
| 3-18.bmp | Anicvr1.bmp |
| 3-19.bmp | Anicvr3.bmp |
| 4-1.bmp | Anicvr2.bmp |
| words.txt | Anicvr.bmp |
| [KEYINDEX] | Animg39.bmp |
| keyword = 1, "Toc Level 1" | Animg40.bmp |
| keyword = 2, "Toc Level 2" | init |
| keyword = 3, "Toc Level 3" | autoexec.scr |
| keyword = 5, "Hidden Index Headings (Chapters)" | backgnd.bmp |
| [FTINDEX] | cover.bmp |
|  | cpyrt.bmp |
| dtype0 = MVBRKR!FBreakWords | paltable |
| dtype1 = MVBRKR!FBreakNumber | credits.bmp |
|  | 1-1.bmp |
| dtype2 = MVBRKR!FBreakDate | bullet.bmp |
| dtype3 = MVBRKR!FBreakTime | note.bmp |
| dtype4 = MVBRKR!FBreakEpoch | 2-1.bmp |
| [DLLMAPS] | 2-2.bmp |
| MVBRKR = MVBK14W.DLL, MVBK14WD.DLL, MVBK14N.DLL, MVBK14ND.DLL | 2-3.bmp |
|  | 2-4.bmp |
|  | 2-5.bmp |
|  | 2-6.bmp |
| MVMCI = MVMC14W.DLL, MVMC14WD.DLL, MVMC14N.DLL, MVMC14ND.DLL | 2-7.bmp |
|  | 2-8.bmp |
| MVIMG = MVMG14W.DLL, MVMG14WD.DLL, MVMG14N.DLL, MVMG14ND.DLL | 3-1.bmp |
|  | 3-2.bmp |
| VERMONT1 = VT216.DLL, VT216.DLL, VT232.DLL, VT232.DLL | 3-3.bmp |
| VRX1 = VRX116.DLL, VRX116.DLL, VRX132.DLL, VRX132.DLL | 3-4.bmp |
|  | 3-5.bmp |
|  | 3-6.bmp |
| VRX2 = VRX216.DLL, VRX216.DLL, VRX232.DLL, VRX232.DLL | 3-7.bmp |
|  | 3-8.bmp |
| [GROUPS] | 3-9.bmp |
|  | 3-10.bmp |
| group = Group1 | 3-11.bmp |
|  | 3-12.bmp |
|  | 3-13.bmp |
|  | 3-14.bmp |
|  | 3-15.bmp |
|  | 3-16.bmp |
|  | 3-17.bmp |
|  | 3-18.bmp |
|  | 3-19.bmp |
|  | 4-1.bmp |
|  | words.bxt |

-continued

| Before | After |
|---|---|
| [KEYINDEX] |  |
| keyword = 1, "Toc Level 1" |  |
| keyword = 2, "Toc Level 2" |  |
| keyword = 3, "Toc Level 3" |  |
| keyword = 5, "Hidden Index Headings (Chapters)" |  |
| [FTINDEX] |  |
| dtype0 = MVBRKR!FBreakWords |  |
| dtype1 = MVBRKR!FBreakNumber |  |
| dtype2 = MVBRKR!FBreakDate |  |
| dtype3 = MV8RKR!FBreakTime |  |
| dtype4 = MVBRKR!FBreakEpoch |  |
| [DLLMAPS] |  |
| MVBRKR = MVBK14W.DLL, MVBK14WD.DLL, MVBK14N.DLL, MVBK14ND.DLL |  |
| MVMCI = MVMC14W.DLL, MVMC14WD.DLL, MVMC14N.DLL, MVMC14ND.DLL |  |
| MVIMG = MVMG14W.DLL, MVMG14WD.DLL, MVMG14N.DLL, MVMG14ND.DLL |  |
| VERMONT1 = VT216.DLL, VT216.DLL, VT232.DLL, VT232.DLL |  |
| VRX1 = VRX116.DLL, VRX116.DLL, VRX132.DLL, VRX132.DLL |  |
| VRX2 = VRX216.DLL, VRX216.DLL, VRX232.DLL, VRX232.DLL |  |
| [GROUPS] |  |
| group = Group1 |  |

APPENDIX "B"

| Before | After |
|---|---|
| SetBackgroundColor(255, 128, 255); | SetBackgroundColor(255, 128, 255); |
| SetPageColor(255, 255, 255); | SetPageColor(255, 255, 255); |
| SetPopupColor(192, 192, 192); | SetPopupColor(192, 192, 192); |
| AttachUI(""); | AttachUI(""): |
| SetBackgroundBitmap("backgnd.bmp",1); | SetBackgroundBitmap("backgnd.bmp",1); |
| StdMenus( ); | StdMenus( ); |
| StdButtons( ); | StdButtons( ); |
| InsertButton('ma_button' 'Net Support', 'JumpURL('http://www.mei.micron.com')', −1); | InsertButton('ma_button', 'Net Support', 'JumpURL('http://www.mei.micron.com')', −1); |
| Splash("cover.bmp", 3,0); | Splash("Animg1.bmp", 0,0); |
| Splash("cpyrt.bmp", 3,1); | Splash("Animg1.bmp",0,0); |
| InsertMenu(', 'mnu_goto', '&GoTo', ', 3); | Splash("Anamg2.bmp",0,0); |
| InsertMenu('mnu_goto', 'pos_0','1: Introduction', 'JumpID('flashpt.mvb > main', 'CHAPTER1')', 0); | Splash("Animg2.bmp",0,0); |
|  | Splash("Animg3.bmp",0,0); |
|  | Splash("Animg3.bmp",0,0); |
|  | Splash("Animg4.bmp",0,0); |
|  | Splash("Animg4.bmp",0,0); |
| InsertMenu('mnu_goto', 'pos_1', '2: Installation', 'JumpID('flashpt.mvb > main', 'CHAPTER2')', 1); | Splash("Animg5.bmp",0,0); |
|  | Splash("Animg5.bmp",0,0); |
|  | Splash("Animg6.bmp",0,0); |
|  | Splash("Animg6.bmp",0,0); |
|  | Splash("Animg7.bmp",0,0); |
| InsertMenu('mnu_goto', 'pos_2', '3: Adapter and Device | Splash("Animg7.bmp",0,0); |
|  | Splash("Animg8.bmp",0,0); |

-continued

| Before | After |
|---|---|
| Configuration',<br>'JumpID('flashpt.mvb > main',<br>'CHAPTER3')', 2);<br>InsertMenu('mnu_goto',<br>'pos_3', '4: Troubleshooting',<br>'JumpID('flashpt.mvb > main',<br>'CHAPTER4')', 3);<br>InsertMenu('mnu_goto',<br>'pos_4', '5: Questions and<br>Answers',<br>'JumpID('flashpt.mvb > main',<br>'CHAPTER5')', 4);<br>InsertMenu('mnu_goto',<br>'pos_5', 'A: Small Computer<br>System Interface',<br>'JumpID('flashpt.mvb > main',<br>'APPA')', 5);<br>InsertMenu('mnu_goto',<br>'pos_6', 'B BusLogic<br>Customer Service',<br>'JumpID('flashpt.mvb > main',<br>'APPB')', 6); | Splash("Animg8.bmp",0,0);<br>Splash("Animg9.bmp",0,0);<br>Splash("Animg9.bmp",0,0);<br>Splash("Animg10.bmp",0,0);<br>Splash("Animg10.bmp",0,0);<br>Splash("Animg11.bmp",0,0);<br>Splash("Animg11.bmp",0,0);<br>Splash("Animg12.bmp",0,0);<br>Splash("Animg12.bmp",0,0);<br>Splash("Animg13.bmp",0,0);<br>Splash("Animg13.bmp",0,0);<br>Splash("Animg14.bmp",0,0);<br>Splash("Animg14.bmp",0,0);<br>Splash("Animg15.bmp",0,0);<br>Splash("Animg15.bmp",0,0);<br>Splash("Animg16.bmp",0,0);<br>Splash("Animg16.bmp",0,0);<br>Splash("Animg17.bmp",0,0);<br>Splash("Animg17.bmp",0,0);<br>Splash("Animg18.bmp",0,0);<br>Splash("Animg18.bmp",0,0);<br>Splash("Animg19.bmp",0,0);<br>Splash("Animg19.bmp",0,0);<br>Splash("Animg20.bmp",0,0);<br>Splash("Animg20.bmp",0,0);<br>Splash("Animg21.bmp",0,0);<br>Splash("Animg21.bmp",0,0);<br>Splash("Animg22.bmp",0,0);<br>Splash("Animg22.bmp",0,0);<br>Splash("Animg23.bmp",0,0);<br>Splash("Animg23.bmp",0,0);<br>Splash("Animg24.bmp",0,0);<br>Splash("Animg24.bmp",0,0);<br>Splash("Animg25.bmp",0,0);<br>Splash("Animg25.bmp",0,0);<br>Splash("Animg26.bmp",0,0);<br>Splash("Animg26.bmp",0,0);<br>Splash("Animg27.bmp",0,0);<br>Splash("Animg27.bmp",0,0);<br>SplashC"Animg28.bmp",0,0);<br>Splash("Animg28.bmp",0,0);<br>Splash("Animg29.bmp",0,0);<br>Splash("Animg29.bmp",0,0);<br>Splash("Animg30.bmp",0,0);<br>SplashC"Animg30.bmp",0,0);<br>Splash("Animg31.bmp",0,0);<br>SplashC"Animg31.bmp",0,0);<br>Splash("Animg32.bmp",0,0);<br>Splash("Animg32.bmp",0,0);<br>Splash("Animg33.bmp",0,0);<br>Splash("Animg33.bmp",0,0);<br>Splash("Animg34.bmp",0,0);<br>Splash("Animg34.bmp",0,0);<br>Splash("Animg35.bmp",0,0);<br>Splash("Animg35.bmp",0,0);<br>Splash("Animg1.bmp",1,0);<br>Splash("Animg39.bmp",0,0);<br>Splash("Animg39.bmp",0,0);<br>Splash("Animg39.bmp",0,0);<br>Splash("Animg39.bmp",0,0);<br>Splash("Animg40.bmp",0,0);<br>Splash("Animg40.bmp",0,0);<br>Splash("Animg40.bmp",0,0);<br>Splash("Animg40.bmp",0,0);<br>Splash("Animg40.bmp",0,0);<br>Splash("Animg40.bmp",0,0);<br>Splash("Animg40.bmp",0,0);<br>Splash("Animg40.bmp",0,0);<br>Splash("Animg40.bmp",0,0);<br>Splash("Animg40.bmp",0,0);<br>Splash("Animg40.bmp",0,0);<br>Splash("Animg39.bmp",0,0);<br>Splash("Animg39.bmp",0,0);<br>Splash("Animg39.bmp",0,0);<br>Splash("Animg39.bmp",0,0);<br>Splash("Animg1.bmp",1,1); |

-continued

| Before | After |
|---|---|
| | Splash("Anicvr.bmp",0,0);<br>Splash("Anicvr1.bmp",0,0);<br>Splash("Anicvr2.bmp",0,0);<br>Splash("Anicvr3.bmp",0,0);<br>Splash("cover.bmp",3,0);<br>Splash("cpyrt.bmp",3,1);<br>InsertMenu(",'mnu_goto',<br>'&GoTo', ',"3);<br>InsertMenu('mnu_goto',<br>'pos_0', '1: Introduction',<br>'JumpID('flashpt.mvb > main',<br>'CHAPTER1')', 0);<br>InsertMenu(mnu_goto',<br>'pos_1', '2 Installation',<br>'JumpID('flashpt.mvb > main',<br>'CHAPTER2')', 1);<br>InsertMenu('mnu_goto',<br>'pos_2', '3: Adapter and Device<br>Configuration',<br>'JumpID('flashpt.mvb > main',<br>'CHAPTER3')', 2);<br>InsertMenu('mnu_goto',<br>'pos_3', '4: Troubleshooting',<br>'JumpID('flashpt.mvb > main',<br>'CHAPTER4')', 3);<br>InsertMenu('mnu_goto',<br>'pos_4', '5: Questions and<br>Answers', 'JumpID('flashpt.mvb ><br>main', 'CHAPTER5')', 4);<br>InsertMenu('mnu_goto',<br>'pos_5', 'A: Small Computer<br>System Interface',<br>'JumpID('flashpt.mvb ><br>main', 'APPA')', 5):<br>InsertMenu('mnu_goto',<br>'pos_6', B: BusLogic Customer<br>Service', 'JumpID('flashpt.mvb ><br>main', 'APPB')', 6); |

What is claimed is:

1. An on-line book, which illustrates at least one animated sequence, comprising:
   a plurality of pages comprising the content of an on-line book;
   an animation sequence inserted into the on-line book such that the animation sequence is in addition to the plurality of pages comprising the content of the on-line book, wherein the animation sequence is displayed in combination with the opening of the on-line book, and wherein the animation sequence comprises at least two graphical images arranged in a sequence such that when displayed in such sequence the at least two graphical images create an animated display;
   a duration of display time for each of the at least two graphical images; and
   one or more computer processors configured to execute instructions for the sequential display of the arranged at least two graphical images for times equal to the designated display times.

2. The on-line book of claim 1 wherein the at least two graphical images comprise an ordered list of images.

3. The on-line book of claim 1 wherein the sequence comprises a predetermined sequence.

4. The on-line book of claim 1 wherein the duration of display comprises a predetermined duration of display.

5. The on-line book of claim 1 further comprising a compilation control file that is compiled to create the on-line book.

6. The on-line book of claim 1 wherein the animated display is generated upon opening the on-line book.

7. The on-line book of claim 1 wherein the graphical images comprise bitmaps.

8. A method of animating an on-line book comprising:
storing a plurality of pages comprising the content of an on-line book;
displaying a page of the online book in response to user input;
displaying an animation sequence in association with the on-line book such that the animation sequence is in addition to the plurality of pages comprising the content of the on-line book, and wherein the animation sequence comprises displaying with one or more computer processors at least two graphical images arranged in a sequence and having a duration of display such that when displayed in such sequence and duration the at least two graphical images create an animated display; and
executing instructions in one or more computer processors to control the animation sequence to perform the sequential display of the arranged at least two graphical images for times equal to the designated display times.

9. The method of claim 8 wherein displaying at least two graphical images comprises displaying an ordered list of images.

10. The method of claim 8 wherein displaying at least two graphical images arranged in the sequence comprises displaying at least two graphical images arranged in a predetermined sequence.

11. The method of claim 8 wherein having the duration of display comprises having a predetermined duration of display.

12. The method of claim 8 further comprising compiling a compilation control file to create the on-line book.

13. The method of claim 8 further comprising generating the animated display upon opening the on-line book.

14. The method of claim 8 wherein displaying the at least two graphical images comprises displaying at least two bitmaps.

15. An on-line book which illustrates at least one animated sequence, comprising:
means for storing a plurality of pages comprising the content of an on-line book;
means for displaying a page of the online book in response to user input;
means for displaying with one or more computer processors an animation sequence in associated with the on-line book such that the animation sequence is in addition to the plurality of pages comprising the content of the on-line book, wherein the animation sequence comprises at least two graphical images arranged in a sequence and having a duration of display such that when displayed in such sequence and duration the at least two graphical images create an animated display; and
means for executing instructions in one or more computer processors for the sequential display of the arranged at least two graphical images for times equal to the designated display times.

16. The on-line book of claim 15 wherein the at least two graphical images comprise an ordered list of images.

17. The on-line book of claim 15 wherein the sequence comprises a predetermined sequence.

18. The on-line book of claim 1 wherein the duration of display comprises a predetermined duration of display.

19. The on-line book of claim 1 further comprising a means for compiling a compilation control file to create the on-line book.

20. The on-line book of claim 15 wherein the animated display is generated upon opening the on-line book.

* * * * *

UNITED STATES PATENT AND TRADEMARK OFFICE
CERTIFICATE OF CORRECTION

PATENT NO.      : 7,652,669 B2                                          Page 1 of 1
APPLICATION NO. : 11/233714
DATED           : January 26, 2010
INVENTOR(S)     : James A. McKeeth It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 706 days.

Signed and Sealed this

Twenty-third Day of November, 2010

David J. Kappos
*Director of the United States Patent and Trademark Office*